March 1, 1966   H. LISSNER   3,237,534
PROCESS OF MANUFACTURING SACKS
Filed Jan. 23, 1963   10 Sheets-Sheet 1
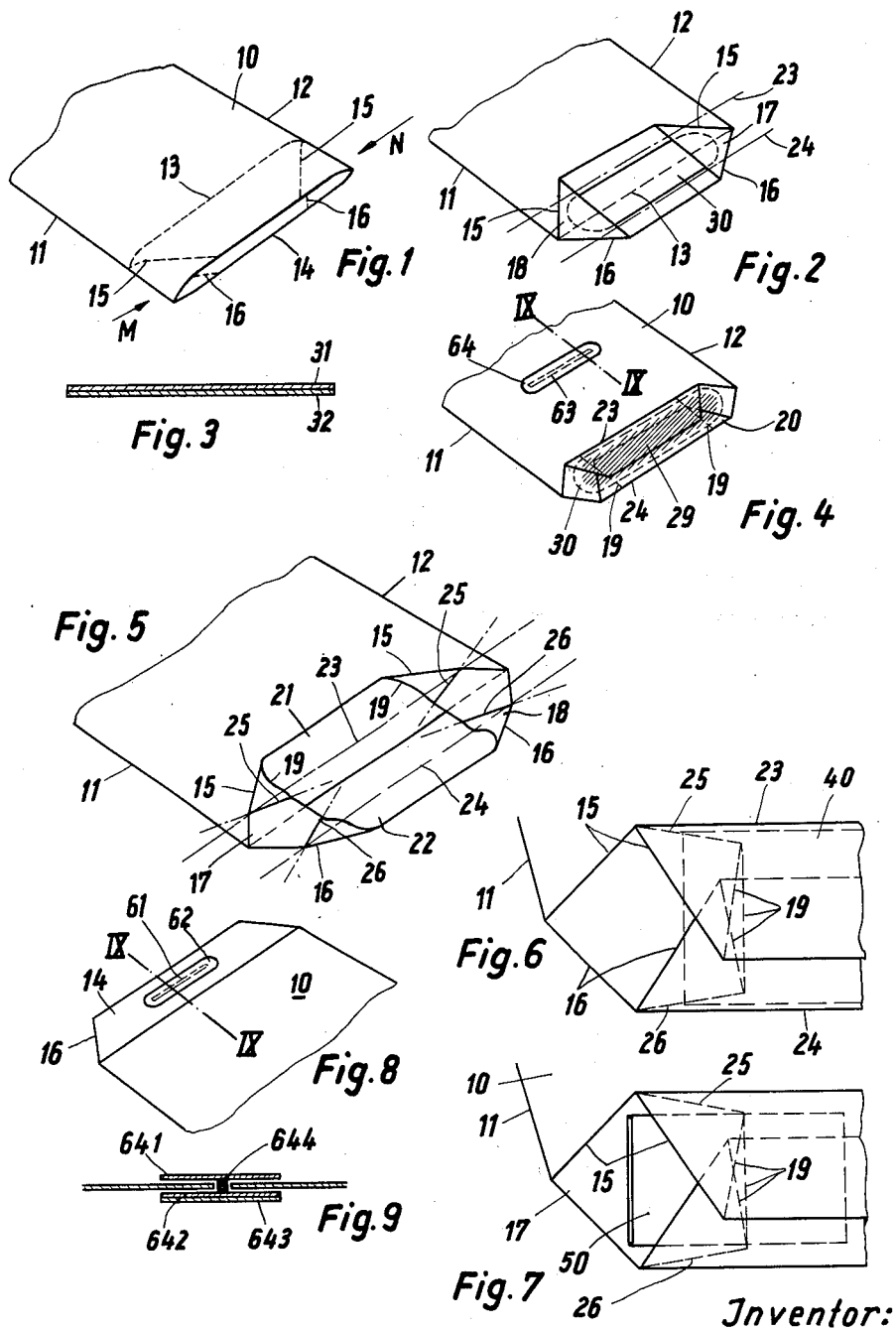
Inventor:
Hans Lissner March 1, 1966   H. LISSNER   3,237,534
PROCESS OF MANUFACTURING SACKS
Filed Jan. 23, 1963   10 Sheets-Sheet 2

Inventor:
Hans Lissner

March 1, 1966  H. LISSNER  3,237,534
PROCESS OF MANUFACTURING SACKS
Filed Jan. 23, 1963  10 Sheets-Sheet 3

Inventor:
Hans Lissner

March 1, 1966  H. LISSNER  3,237,534
PROCESS OF MANUFACTURING SACKS
Filed Jan. 23, 1963  10 Sheets-Sheet 4
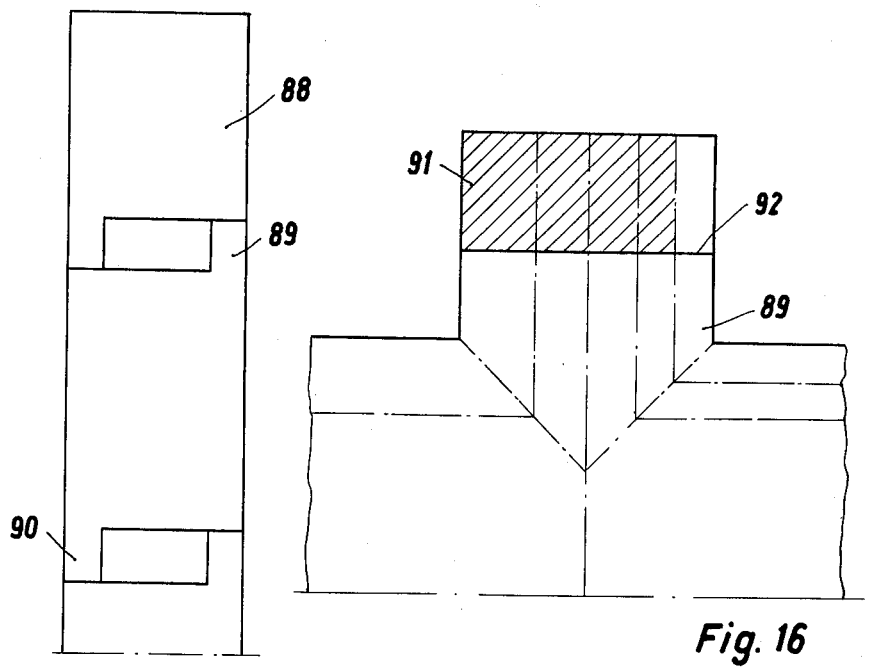
Fig. 15
Fig. 16
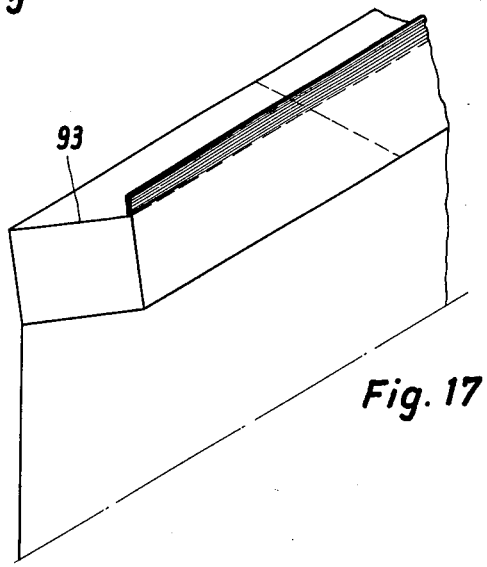
Fig. 17
Inventor:
Hans Lissner March 1, 1966  H. LISSNER  3,237,534
PROCESS OF MANUFACTURING SACKS
Filed Jan. 23, 1963  10 Sheets-Sheet 6

Inventor:

Hans Lissner

Inventor:

March 1, 1966   H. LISSNER   3,237,534
PROCESS OF MANUFACTURING SACKS
Filed Jan. 23, 1963   10 Sheets-Sheet 9

Inventor:
Hans Lissner

March 1, 1966  H. LISSNER  3,237,534
PROCESS OF MANUFACTURING SACKS
Filed Jan. 23, 1963  10 Sheets-Sheet 10

Inventor:

Hans Lissner

United States Patent Office 3,237,534
Patented Mar. 1, 1966

3,237,534
PROCESS OF MANUFACTURING SACKS
Hans Lissner, Pigageallee, Dusseldorf-Benrath, Germany
Filed Jan. 23, 1963, Ser. No. 253,385
Claims priority, application Germany, Jan. 29, 1962,
L 41,073; Feb. 12, 1962, L 41,194; Mar. 2, 1962,
L 41,365; Apr. 13, 1962, L 41,740
5 Claims. (Cl. 93—35)

This invention relates to a process of manufacturing sacks which in filled condition assume a prismatic or parallelepipedic shape, as well as to sacks, particularly valved sacks, which have been manufactured by such process.

It has been desirable for a long time to impart a prismatic or parallelepipedic shape to sacks or the like containers in order to secure the advantages of stackability and an efficient utilization of space which are due to this three-dimensional configuration.

Sacks made from materials, such as paper, can be designed without difficulty so that the sack assumes the desired prismatic shape when it is filled. For this purpose, the so-called crossed bottom sack is generally used, in which the wall portions laid one over the other to form the bottom can be adhesively connected in a simple manner. Such a process is not applicable, however, to the manufacture of sacks from plastics, as has become usual on a large scale. Particularly the smooth surface finish of plastics has previously prevented the making of an effective and durable joint with adhesives.

Joints in sacks of plastics are generally made by welding. Such a welding cannot be performed on crossed bottoms without special precautions because the welding pressure and welding heat would not only act on the crossed bottom but also on the container wall portion disposed opposite to the crossed bottom during the welding operation. For this reason, it was initially accepted that valved sacks could not be made with crossed bottoms and a number of other ways have been adopted to obtain nevertheless sacks of prismatic shape.

It is an object of the invention to provide a process which enables sacks of plastics to be provided also with crossed bottoms to give them in a relatively simple manner the prismatic shape, which is often desirable for the reasons stated above.

Based on these recognitions, a process of manufacturing sacks of plastics, which sacks have a prismatic shape when filled, is characterized in that the wall portions adjacent to the open ends of lengths of tubing are infolded like a crossed bottom, as is known in the manufacture of paper sacks having crossed bottoms. These infolded portions must then be joined by welding. To prevent the impermissible welding of the bottom to the wall portions of the container, a special separating means is inserted between the inside surface of the bottom and the inside surface of the wall portions before the welding operation is performed. This separating means may be a strip which is inserted while the marginal portions are infolded to form the crossed bottom, or of an implement, which forms a supporting surface and serves as a separating means, and at the same time as an abutment, only during the welding operation and after the same is removed and re-used in the making of the next crossed bottom. This supporting means, which may consist of a linkage having two spreadable arms, may be introduced into the welding area through an opening in the wall of the container and may then be removed through this opening, which is subsequently closed.

If a separate strip rather than a rigid support is used as a separating means, the same may be designed so that it is included in the welding operation and is thus positioned relative to the container so that the strip may remain in the container without being a disturbance or adversely affecting the filling and/or emptying operations, as would have to be feared in connection with a part which is loose with respect to the sack after the welding operations. In this connection, it has proved particularly advantageous if a strip which prevents the welding of the bottom to the wall portions is made from a composite sheet. This composite sheet consists of two layers of different materials, the first layer having a relatively low melting point and the second layer having a relatively high melting point. If the layer having a relatively low melting point faces the crossed bottom and the layer having a relatively high melting point faces the container wall, the inserted strip will be welded on one side to the crossed bottom whereas the other side is not joined to the container wall.

Alternatively, the separating strip may consist of a material which is not affected by the welding operation and only prevents a welding of the container wall to the bottom of the container; after the welding operation has been completed, this strip is removed from the interior of the container through a special opening, which is similar to the opening through which the above-mentioned implement can be removed out of the sack. It will depend on the individual conditions whether the access opening to the interior of the sack is provided in the central portion of the sack or two openings are provided, each of which is adjacent to one bottom portion.

If the bottom of the container is folded in the usual manner, known per se, to form the crossed bottom, the edges of the crossed bottom might be included in the welding area so that undesirable conditions would be created in the transitional area between the crossed bottoms and the walls of the container. For this reason, the invention may be carried out in such a manner that the wall portions at the end of the length of tubing are infolded from the edges in triangular form, whereafter striplike portions of the bottom are infolded along lines extending substantially at right angles to the longitudinal direction of the length of tubing, as is usual in the known method of forming crossed bottoms, and precaution is taken during this infolding that that portion of the triangle which is involved therein is not infolded on the same line on which the striplike portions of the bottom are reversely folded, but the folding of said portion of the triangle is effected on a line which is at an acute angle to the line on which the bottom portions are infolded. As a result, the welding operation need not be carried out entirely to the boundary edges of the bottom but may be terminated a short distance before said edges so that the sack is completely closed at the bottom but a non-welded area remains between the welded area itself and the boundary edges of the bottom. Further details in this connection will be explained with reference to the illustrative embodiment to be described hereinafter.

If the container made by the process according to the invention is a sack provided with a valve, particularly desirable results will be obtained if the valve is provided within one of the folded portions of the corner areas of the sack because it is then highly protected from external damage.

If it is desired to avoid the formation of a double bottom and to restrict the consumption of material, it will be recommendable to insert a weld-preventing separating means into the folded bottom before the crossed bottom is welded and in such a manner that the entire bottom can be welded in the areas to be joined, except for the filling opening, and to pull the separating means out of the filling opening after the welding operation. In this case, the separating means consist advantageously of a swordlike implement, e.g., a strip of metal or wood, of a material having a low thermal conductivity, the point of the sword-like implement being inserted below the pocket of that corner of the sack which is opposite to the filling opening.

If a valve is to be provided at the filling opening, the process according to the invention enables the welding of the valve in a simple manner and in one operation to the crossed bottom to form a valve hose, using weld-preventing separating means which are applied to the inside and outside of the valve.

There are mainly two ways in which the valve may be applied to the sack. The valve may either be welded as a flat sheet to a pocket formed when the sack is infolded to form the crossed bottom or, where a tubing of plastic is used as a starting material for the sacks, the valve is made integrally with the sack by an offset cut made to sever the tubing.

The weld-preventing separating means may suitably consist of paper, fabric or the like, which is applied and particularly adhered to the valve sheet; in the first case mentioned above, an approximately T-shaped area is left free for the welding areas.

In a desirable development of the invention, it is recommendable in folding the crossed bottom to fold back one-half portion of the bottom approximately at the center thereof so as to form the valve hose, and to apply said back-folded half portion to the reversely folded other half portion of the bottom when the valve sheet edges to be welded have been laid together.

If the valve is made integrally with the sack by an offset cut, that portion of the valve hose which protrudes freely into the sack may be provided with a weld-preventing separating agent except for the range where welding is performed to form the hose. The portion forming the valve may be provided with a lateral incision, which limits that portion of the valved hose which protrudes freely into the sack; the length of said incision is equal to the width on which the half portions of the crossed bottom overlap; in folding of the crossed bottom, one half portion of the bottom is folded back approximately at its center and is applied to the other half portion of the bottom when the valve edges to be welded have been laid together to form the valve hose. To enable a reduction of the welding area, it is recommendable to infold marginal areas of the reversely folded half portions of the crossed bottom once more before the welding operation. Besides, within the scope of the invention, the edges of the reversely folded half portions of the crossed bottom may be laid to contact each other and be welded to a cover strip or the edges may be laid to be spaced apart and the valve and the bottom be welded to one cover sheet each.

In sacks made by the process according to the invention, it is particularly suitable if the valve hose protruding from the sack is stiffened in its axial direction to facilitate the opening of the sack and to enable the hose to be turned down and inserted into a non-welded, pocketlike portion of the crossed bottom when the sack has been filled.

The valve hose may be infolded and the infolded portion may be folded out to enable the hose opening to be welded. In this case, the surfaces to be welded will remain clean and the material filled into the sack cannot deposit on said surfaces. Hence, the valve opening can always be properly welded when the sack has been filled. Adhesive tape may alternatively be used to stiffen the edge of the valve opening and may be removed for the welding operation. This will also ensure that the surfaces to be welded remain clean.

To cause the valve opening to be pulled open when the bottom is being compressed, it is suitable to connect the valve hose and the sack bottom by adhesive tape.

It is particularly desirable to accommodate in a pocket formed by the crossed bottom and accessible from the outside a supply of adhesive tape serving for adhesively sealing any cracks.

Because the portions of the crossed bottom must take up particularly high tensile stresses, it is recommendable to make the seam welds in the overlap areas as wide as possible. The wide seam welds will also effectively prevent any formation of a notch, which in the case of narrow seam welds may easily cause tearing at the welds.

In another method of manufacturing sacks according to the invention, lengths of tubing are folded open at their open ends to form two triangular pockets which are symmetrical with respect to the longitudinal edges of the tubing, and weld-preventing separating means are inserted into the resulting pockets, a substantially rectangular bottom sheet is then substantially symmetrically applied to these pockets to overlap the pockets at least in part and is joined to the triangular pockets in the overlap area by seam welds extending parallel to the longitudinal direction of the hose, then the separating means inserted into the triangular pockets to prevent a joint between the inside surfaces of the pockets are removed and the bottom sheet is thereafter joined to the length of tubing by additional seam welds extending substantially at right angles to the longitudinal direction of the tubing. Finally, the bottom portions formed by folding open the ends of the length of tubing are infolded on lines extending transversely to the longitudinal direction of the tubing and so that said bottom portions overlap, as in the formation of a crossed bottom, and are welded together while being shielded by a weld-preventing separating means from the surface of the bottom sheet remote from the interior of the length of tubing.

In a desirable development of the invention, a valve insert may be first applied onto one of the triangular pockets before the bottom sheet is joined to them, whereafter a weld-preventing separating means is inserted into the interior of the valve insert and the bottom sheet is fixed relative to the triangular pockets by seam welds extending parallel to the longitudinal direction of the tubing.

Favorable strength properties of the bottom will be obtained if the bottom portions formed by folding open the ends of the length of tubing are reversely folded on lines which extend at right angles to the longitudinal direction and in the bottom sheet area defined by the seam welds extending at right angles to the longitudinal direction of the tubing; in this case, the transverse seam welds will be disposed inside the bottom area proper so that the stresses which they must resist are substantially restricted to tangentially directed stresses, which are less dangerous for seam welds. It has also proved desirable to provide the bottom sheets to be used for the formation of the bottom with valve inserts before they are joined to the lengths of tubing so that the valve and the bottom sheet need not be separately joined. Such a bottom sheet may take various forms. For instance, the valve insert may be inserted through a slot in the bottom sheet and be located in this position or a valve insert may be unilaterally tacked to the bottom sheet. Depending on the nature of the contents of the sack, a separate valve insert need not be provided at all and the bottom sheet may have a valve action due to an overlap of two bottom sheet surface portions defining the valve opening.

Finally, the length of tubing used in making the sack may be provided at each of its open ends with two short slits which are parallel and symmetrical to the longitudinal edges of the tubing before the latter is folded out. When the length of tubing is then folded out at its ends, this will not only result in the formation of simple triangular pockets but the pockets will have protruding extensions whereas the wall portions disposed between the slits form lugs which can be used to advantage in completing the bottom.

Instead of providing the lengths of tubing with slits, substantially rectangular strips, which are symmetrical with respect to the center line of the tubing and small ends of which are parallel to the longitudinal edges of the tubing, may be removed from the ends of the length of tubing before it is folded open. This procedure results also in triangular pockets having narrow, rectangular extensions, to the surface of which the bottom sheet to be inserted may be joined, as in the process explained hereinbefore, and which may also provide a guide for a separating means by which the inside surfaces of the wall portions folded open can be shielded from the welding areas. The bottom sheet may be joined, as has been indicated, by causing marginal areas of the bottom sheet to overlap the pocket projections and using a separate separating means for covering the welding areas. Alternatively, the bottom sheet may previously be prepared by providing it in the areas to be joined to the pocket projections with a special layer having a melting point above the temperature which is reached during the making of the seam weld; this layer faces the adjacent inside surfaces of the bottom portions folded open so that a welding of these inside surfaces is prevented. Thus, the need for using a separate separating sheet is eliminated.

Based on a length of tubing from the ends of which the rectangular strips have been cut out, the triangular pockets formed by folding open may be desirably connected by a bottom sheet having boundary edges which extend parallel to the longitudinal direction of the tubing and are spaced apart by a distance which corresponds to the length of the strip which has been removed so that the bottom sheet is guided by the free sides of the triangular pockets and the adjoining rectangular projections whereas those boundary edges of the bottom sheet which extend transversely to the longitudinal direction of the tubing are spaced apart by a distance which is at least larger than the spacing between the longitudinal edges of the tubing wall portions spread apart. The boundary edges of the bottom sheet which extend parallel to the longitudinal direction of tubing may be particularly spaced apart by such a distance that the bottom sheet portions extending in the bottom area can be caused to overlap each other so that there is no need for infolding the bottom portions, as in folding a crossed bottom, and a relatively wide sack bottom is obtained.

If the small ends of the strips to be removed from the ends of the lengths of tubing are longer by one seam width than half the distance between the small ends of the strips, the folding open of the length of tubing at its ends will result in the formation of triangular pockets having rectangular projections which overlap each other so that a complete bottom is formed and the need for a separate bottom sheet is eliminated.

In this case, the bottom may either be completed by symmetrically infolding bottom portions along lines extending transversely to the longitudinal direction of the tubing as in folding a crossed bottom, whereafter these portions are caused to overlap and welded together, or a cover sheet may be attached from the outside walls of the sack to the bottom portions like a bridge; in this case, the distance of the bottom sheet from the boundary edges of the bottom extending transversely to the longitudinal direction of the tubing is preferably shorter than the distance between the boundary edges when the bottom portions are spread apart. The welded areas between the cover sheet and bottom will then lie within the final bottom area when the sack has been filled so that the seam welds are subjected in a desirable manner to tangentially rather than to normally directed stresses and their strength is thus utilized in a desirable manner.

In addition to the seam welds extending parallel to the longitudinal direction of the tubing and required either for joining the bottom portions to the projections of the triangular pockets or in the overlap area of the pocket projections formed when strips having small ends which correspond substantially to one half of the length of the distance between said small ends are removed from the lengths of tubing at the ends thereof, further seams are required, which extend at right angles to the above-mentioned seams, i.e., transversely to the longitudinal direction of the tubing, and by which the sacks are finally and completely closed in the bottom area. These seams may be completed either in a manner known per se when the bottom portions are still folded open or when the bottom portions have been approximately symmetrically folded toward each other on lines extending transversely to the longitudinal direction of the tubing and have been caused to overlap. In this case, it is sufficient to provide a suitable separating means to protect the underlying bottom area from being affected by the seam welds. If the seam welds extending transversely to the longitudinal direction of the tubing are not made until the bottom portions have been infolded in the final form of the bottom, they may be advantageously made in one operation together with the seam welds required for joining the mutually overlapping bottom portions.

The bottom sheets and/or the cover sheet may suitably consist of a material which differs from the material used to form the remaining part of the sack and which is softer and more yieldable than the latter so that peak stresses set up in the tightly filled sack by shock or impact can be taken up by these softer bottom portions and a tearing of the harder and more rigid side wall portions of the sack is prevented.

Several embodiments of the invention are shown by way of example in the drawing, in which FIG. 1 shows a length of tubing to be subjected to the further processing and FIG. 2 the infolding of the wall portions in the marginal area of the length of tubing in the first stage of the formation of the crossed bottom, and the insertion of a separating means.

FIG. 3 shows a separating means,

FIG. 4 the completed crossed bottom with the separating means below the same,

FIG. 5 the formation of the crossed bottom in a somewhat modified method,

FIG. 6 a crossed bottom made by the method shown in FIG. 4,

FIG. 7 a crossed bottom according to FIG. 5 and provided with a valve and

FIG. 8 in perspective a portion of a container having close to its bottom an opening for removing the separating means.

FIG. 9 is a transverse sectional view of a closing strip suitable for closing the opening through which the separating means is removed.

Figure 11:
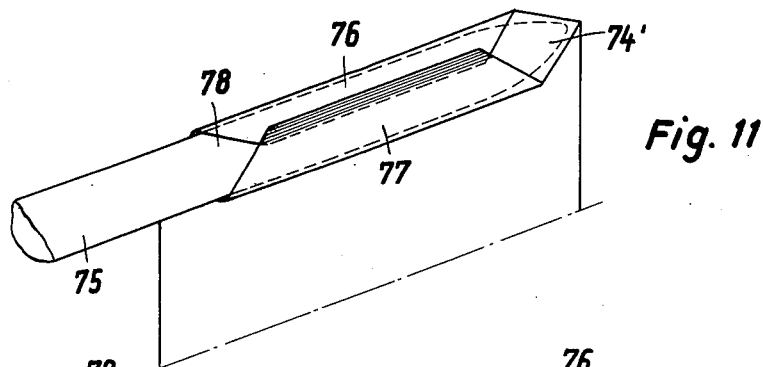
Figure 12:
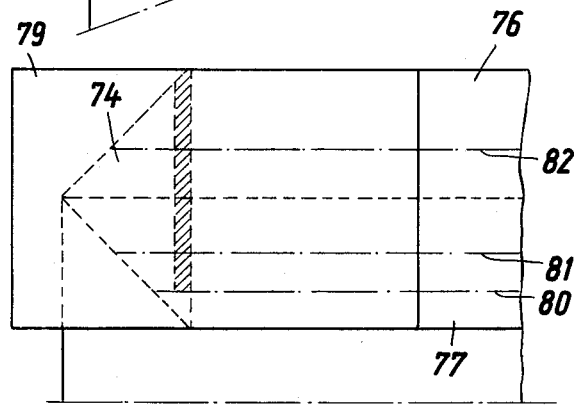
Figure 13:
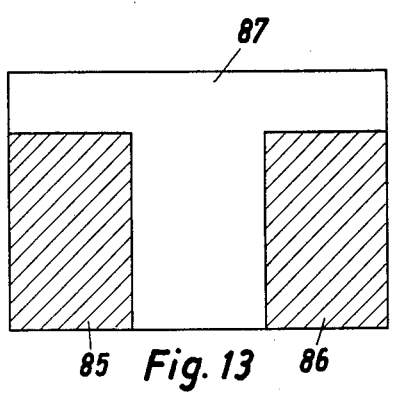
Figure 14:
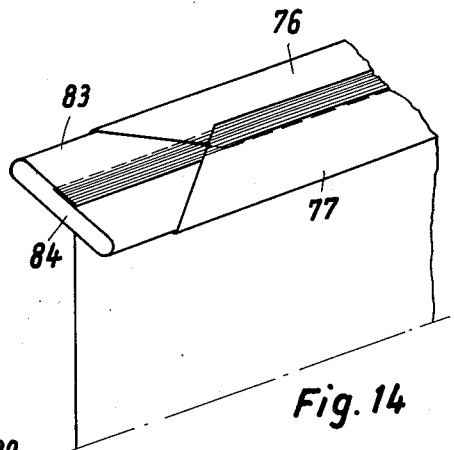

FIG. 11 a crossed bottom with an inserted sword-like implement,

FIG. 12 the application of a valve sheet,

FIG. 13 a valve sheet to which paper or the like is adhesively applied,

FIG. 14 a finished sack bottom with a filling valve,

FIG. 15 the severing of the sacks from a tubing of plastics by an offset cut,

FIG. 16 a valve lug according to FIG. 15 before it is infolded and

FIG. 17 a complete sack with a valve pocket.

Figure 18:
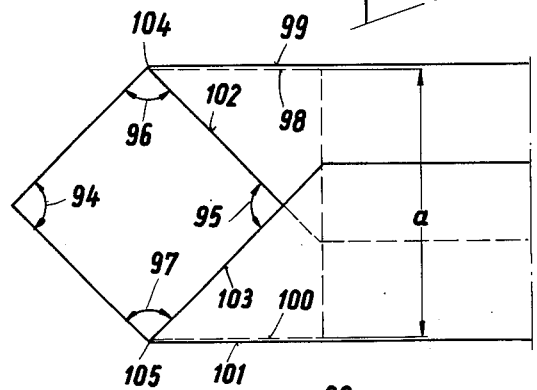
Figure 19:
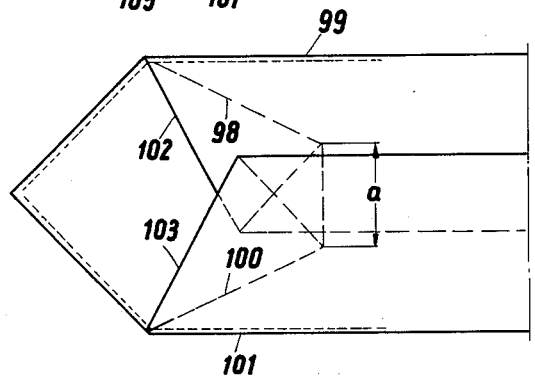

FIGS. 18 and 19 show different modes of folding the portions of the crossed bottom.

Figure 20:
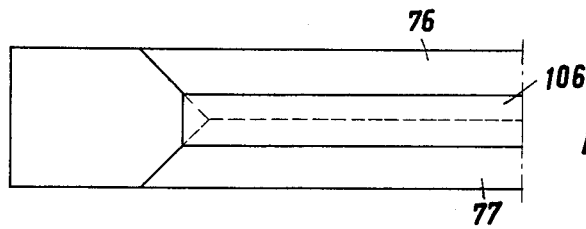
Figure 21:
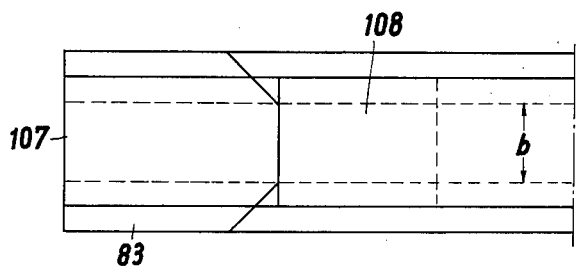
Figure 23:
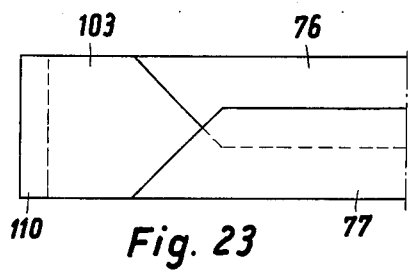
Figure 22:
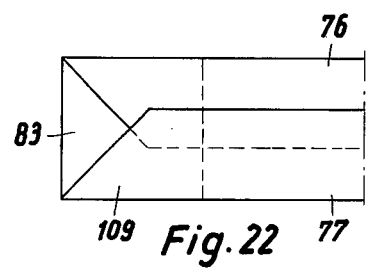
Figure 24:
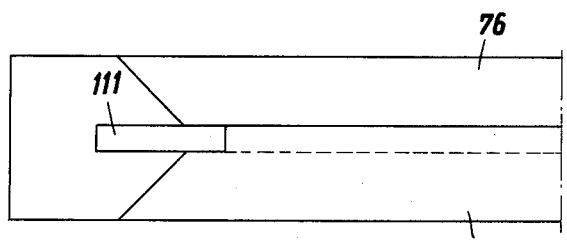
Figure 25:
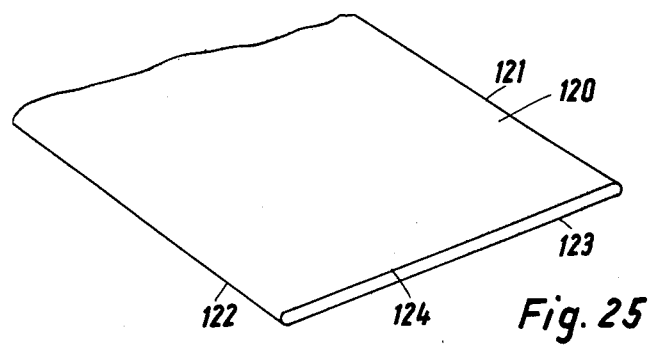
Figure 26:
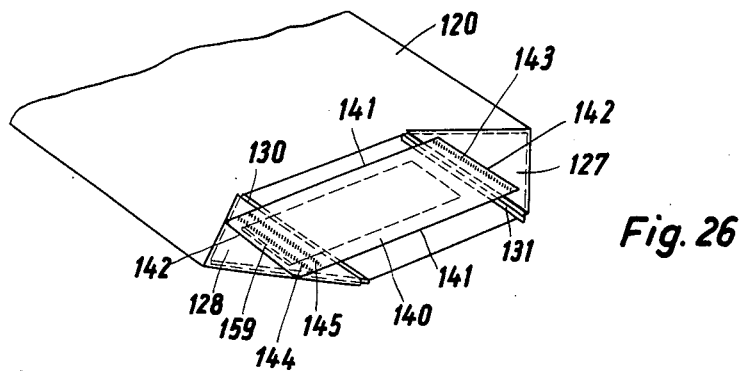
Figure 27:
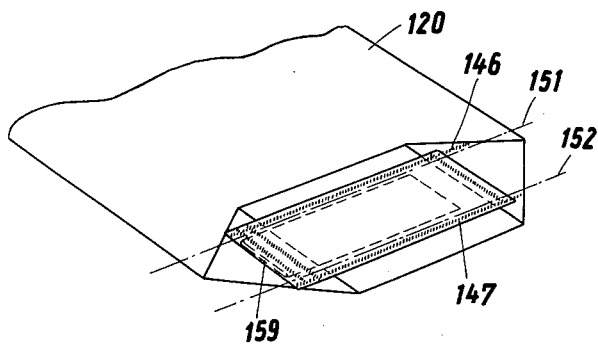
Figure 28:
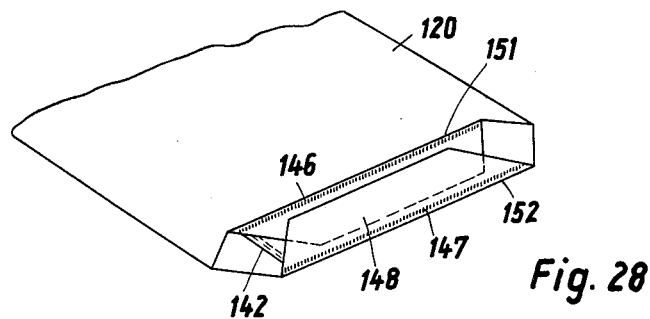
Figure 29:
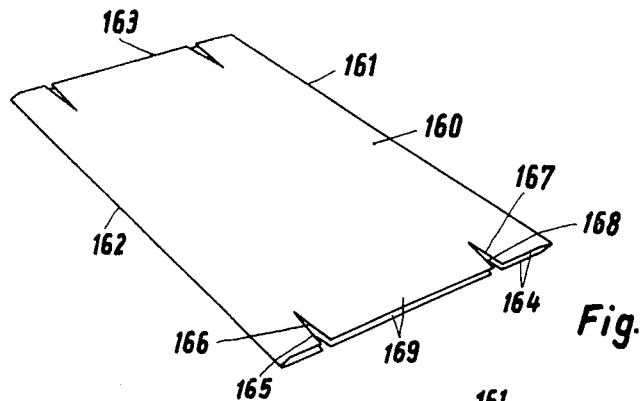
Figure 30:
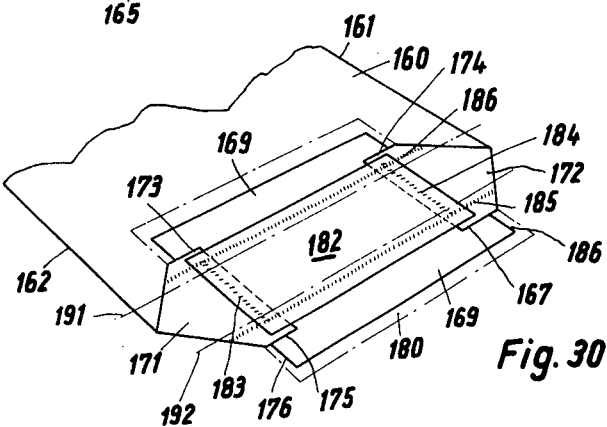

FIG. 20 shows a sack bottom to which cover strips have been welded,

FIG. 21 a valve and a sack bottom with cover sheets,

FIG. 22 a sack bottom with an infolded valve hose,

FIG. 23 a valve opening with an infolded edge portion,

FIG. 24 an adhesive tape connecting the valve hose to the bottom,

FIG. 25 a length of tubing used as a blank in the manufacture of the sack according to the invention, FIG. 26 the length of tubing of FIG. 25 after the end of the tubing has been folded open and the bottom sheet has been applied, FIG. 27 the length of tubing of FIG. 26 after the making of further seam welds for joining the bottom sheet to the container, FIG. 28 in a perspective view a portion of a sack after the completion of the bottom, FIG. 29 a length of tubing which is slit at its ends and FIG. 30 a length of tubing according to FIG. 29, which tubing has been folded open and provided with a bottom sheet and, if desired, with a separating means.

Figure 31:
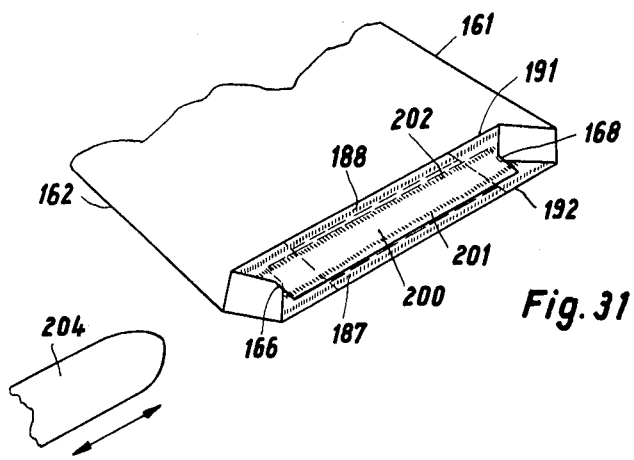

FIG. 31 illustrates the finished sack bottom and

Figure 32:
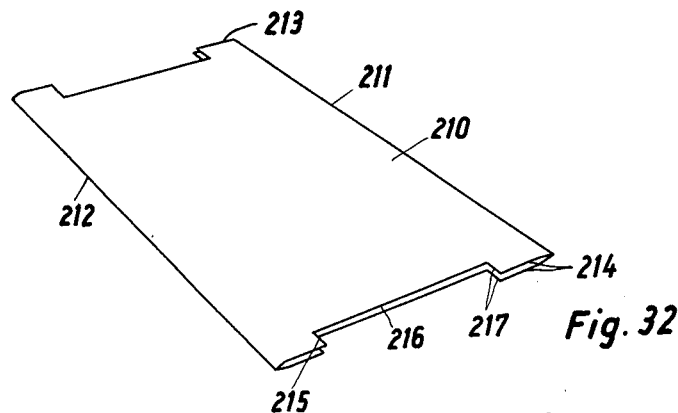

FIG. 32 another method of pretreating the length of tubing by removing rectangular strips which are symmetrical with respect to the edges of the tubing from the ends of the latter.

Figure 33:
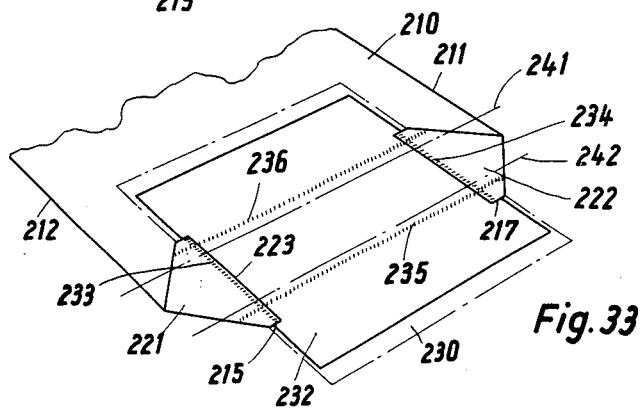

FIG. 33 shows a length of tubing according to FIG. 32 after the same has been folded open at its open ends and the triangular pockets have been bridged with a bottom sheet.

Figure 34:
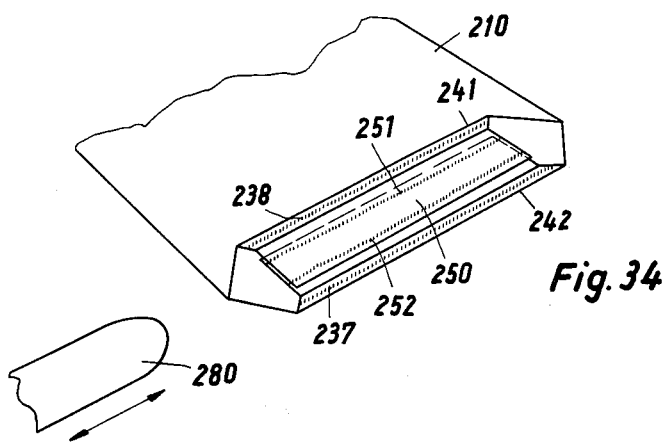

FIG. 34 shows a sack bottom according to FIG. 33 after completion and

Figure 35:
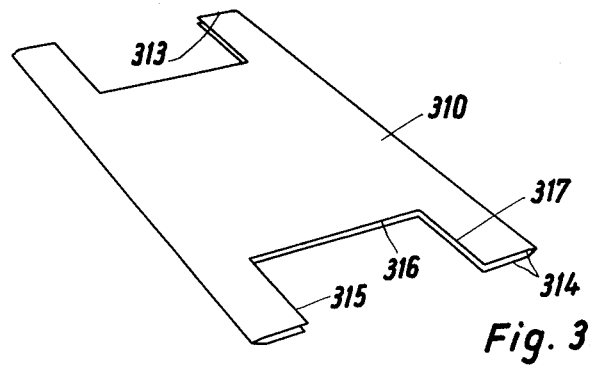

FIG. 35 a length of tubing formed at its ends with rectangular cut portions having small ends which have approximately half the length of the longitudinal sides of the cut-out portions.

Figure 36:
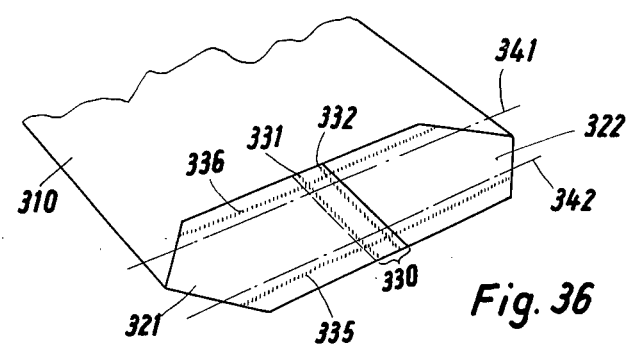
Figure 37:
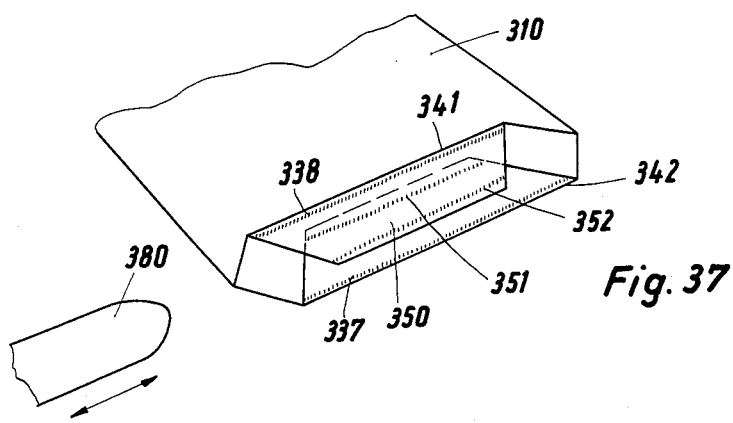

FIG. 36 shows a length of tubing according to FIG. 35 after it has been folded open at its open ends and FIG. 37 a sack according to FIGS. 35 and 36 after the bottom has been completed in the manner in which a crossed bottom is folded.

Figure 38:
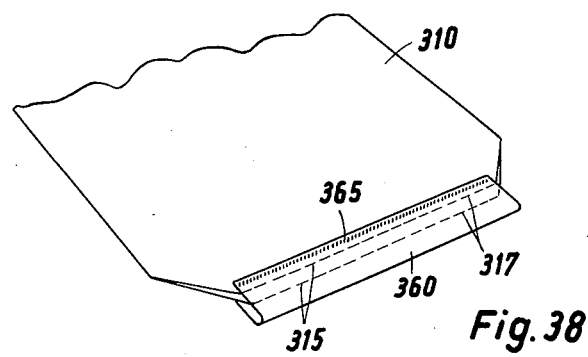
Figure 39:
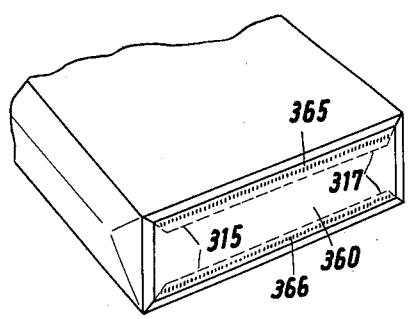

FIG. 38 shows a sack bottom according to FIG. 36 bridged by a separate cover sheet and FIG. 39 the shape of a sack according to FIG. 38 after it has been filled.

On principle, the blank may have any desired form provided that the material forms a closed envelope, the generatrices of which are substantially at right angles to each other. In the embodiment shown by way of example, a section severed from a tubing is employed. This length of tubing has longitudinal edges 11 and 12 and has open ends. 15 and 16 are lines on which the wall portion beyond line 13 is folded in the direction of the arrows M and N. As is particularly apparent from FIG. 2, a portion 14 is folded out along line 13 whereas the areas between lines 15 and 16 form flat triangles 17 and 18 (FIG. 2). In this case, the triangular portions 17 and 18 together with the portions 14 form pockets, below which a separating strip 30 is disposed. As is shown in FIG. 3, this separating strip 30 may consist of a compound sheeting having two layers 31 and 32, which are directly bonded together. The layer 31 may consist, e.g., of the same material as the container itself whereas the layer 32 consists of a material which has a much higher melting point than the layer 31, e.g., of Hostaphan. The layer 31 faces the inside surface of the triangular portions 17, 18 and the layer 32 faces the inside surface of the portions 14. The portions 14 are infolded toward the bottom on lines 23, 24 so that the crossed bottom which is known per se and designated with 20 in FIG. 4 is formed. The overlapping areas of the portions 14 are welded together in a zone 29, in which the weld may be continuous or consist of a plurality of individual seams.

The inserted separating means 30 prevents the welding of the side wall of the container to the bottom. If the separating means consists of the sheet shown in FIG. 3, the layer 31 having a relatively low melting point will also be softened or liquefied during the welding operation to bond the separating strip to the inside of the bottom so that the strip is located relative to the container. The layer 32 consisting of a material having a higher melting point is not affected by the welding operation so that the desired separation between the side wall and bottom of the container is ensured.

If the separating means consists of a material which is not united with the bottom by welding, e.g., of a simple layer of paper, this separating means is suitably removed out of the container to avoid the presence of loose and disturbing foreign matter within the container. For this purpose, the central portion of the container is formed with the opening shown in FIG. 4 and consisting of a slot 63, through which the separating strips can be removed from the interior of the sack when they have become superfluous after the welding operation. This opening 63 is then closed by a separate closing strip.

The structure of such a closing strip is apparent from FIG. 9. The closing strip consists essentially of a strip 641, and a strip of compound sheeting consisting of the layers 642, 643. The strip 641 and the strip 642, 643 of compound sheeting are joined by a seam weld 644, which is similar to a web between the strips 641 and 642, 643 so that the closing strip can be inserted through the slot 63 as a button through a buttonhole and the cover strip 641 can then be welded to the underlying container portion. The layers 641 and 642 may consist of the same material as the side walls of the container and may have a relatively low melting point whereas the layer 643 has a higher melting point. Hence, the welding of the closing strip to the container causes the layers 641 and 642 to fuse with the wall of the container whereas the layer 643 acts as a separating means and ensures that the opposite side wall of the sack 10 is not affected by the welding operation.

Instead of individual separating strips 30, the separating means may consist of a special implement, for instance, a linkage inserted through the opening 63 and having arms which spread apart below the bottom to act as a separating means and to form at the same time the support required for carrying out the welding operation.

Instead of providing a central opening, such as the slot 63 shown in FIG. 4, slots 61 may be provided close to each bottom portion 61. The function of such slots 61, however, is substantially the same as that of the slot 63. When the separating strip or the implement serving as a separating means has been removed out of the interior of the container, this opening 61 is also closed by a strip 62 similar in structure to that shown in FIG. 9.

If the weld of the crossed bottom 20 shown in FIG. 4 is considered more in detail, it will be found that the welding area 29 must extend to or even beyond the edges 23, 24 to ensure an absolutely tight seal of the crossed bottom because the infolded triangular portions must also be sealed throughout the length of the edges 19, where the contents of the sack might otherwise emerge. In order to provide here for a higher safety and clearer arrangement, those areas of the triangular portions 17, 18 which are reversely folded when the bottom portions 14 are infolded on the lines 23, 24, should not also be folded about the lines 23, 24 but about lines 25, 26 extending at acute angles to lines 23, 24 (see FIG. 5). This results in a crossed bottom folded as shown in FIG. 6. In this case, the welding operation can be carried out throughout the length of the edges 19 whereas the welding area 29 need not extend to the fold lines 23, 24 which are at the same time boundary edges of the crossed bottom. It is also apparent from FIG. 6 that the crossed bottom may be reinforced by the application of an additional cover sheet 40. FIG. 7 shows the arrangement of a valve 50 within a crossed bottom 20 as has been explained with reference to FIG. 6 In this case, the valve 50 is disposed below those areas of the triangular portions 17, 18 which have been moved beyond the lines 25, 26 by the folding operation. As a result, the straight portion of the edge 19 in FIG. 7 is below the valve 50 whereas the oblique portions of the edge 19 are above the valve 50. The valve itself is located relative to the container 10 when the welded area 29 is being made. To maintain a free passage through the valve, another separating means is provided in the valve insert to prevent welding of the confronting inside surfaces of the valve insert during the formation of the welded area 29.

Figure 10:
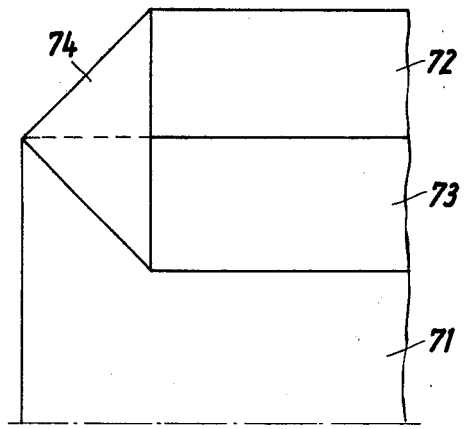
FIG. 10 illustrates the first step of forming a corner of the sack.

In FIG. 10, only a portion of the sack 71 is shown, which has two bottom portions 72, 73 and a triangular pocket 74 formed by folding. After folding as shown in FIG. 10, the swordlike implement 75 serving as a weld-preventing separating means is applied and its point is inserted below the opposite triangular pocket 74', as is shown in FIG. 11. The half portions 76 and 77 of the crossed bottom are then applied over the swordlike implement and welded together in the overlap area. After the welding operation, the swordlike implement 75 is pulled out of the slot 78, which forms now the filling opening of the sack.

In the manufacture of valved sacks, a sheet 79 is first welded up to the fold line 80 to the pocket 74 according to FIG. 12, in which the welded area is hatched. After the swordlike implement 75 has been applied, the crossed bottom is folded at the lines 81 and 82 and one half portion 77 of the bottom is folded back about the line 80 to enable the formation of a hose at the valve 83 (FIG. 14). The backfolded portion is finally applied to the bottom portion 76 so that the welding of the valve hose and bottom can now be completed in one operation. After the welding operation, the swordlike implement is pulled out of the valve opening 84. To prevent a welding of the bottom to certain portions of the valve, particularly to the portion protruding into the sack, the valve sheet is covered with a weld-preventing separating means, such as paper, fabric or the like, as is indicated in FIG. 13 at 85 and 86. Welding is effected in the approximately T-shaped area 87 which remains free.

If individual sacks are severed from a tubing 88, each sack may be formed with two valve lugs 89 and 90 by offset cuts, as is indicated in FIG. 15. The valve lug 89 is separately shown in FIG. 16. The hatched portion 91 of the valve lug 89 is again covered with a weld-preventing separating means so that the hose portion protruding into the sack is freely movable and not welded to the bottom. The incision 92 enables the formation of a hose within the sack. The dash-and-dot lines indicate fold lines. The bottom is then folded and completed exactly as in the embodiment shown in FIGS. 12 to 14. The finished bottom is shown in FIG. 17, in which the valve opening is indicated at 93.

FIG. 18 shows the usual folding of the bottom to form right-angled corners at 94 to 97 and to bring the inside edges 98, 99 and 100, 101, respectively, into contact with each other. To seal the sack, welding is required in the area a. A pivotal movement of the edges 102 and 103 about points 104 and 105 will result in the folded structure shown in FIG. 19, in which the inside edges 98, 99 and 100, 101, respectively, no longer contact each other so that the area a to be welded is much smaller than in FIG. 18 and any danger that the seam weld inside the bottom may be torn open is effectively eliminated. The position of the point of the swordlike implement is indicated with dotted lines in FIG. 19.

According to FIG. 20, the edges of the half portions of the crossed bottom are laid to abut each other and are welded to a cover strip 106. In FIG. 21, the edges are spaced apart by the distance b and cover sheets 107 and 108 are welded to the valve 83 and the bottom, respectively.

As is indicated in FIG. 22, it is suitable so to weld the bottom portions 76 and 77 (FIG. 11) together that a pocket 109 is formed at the corner provided with the valve 83. When the sack has been filled, that portion of the valve hose which protrudes from the sack can be bent over and inserted into this pocket.

The valve 83 shown in FIG. 23 is infolded at 110 to facilitate the opening of the valve during the filling operation and to provide clean welding surfaces for closing the valve opening by welding after the infolded portion has been folded out. Instead of infolding the valve, an adhesive tape may be applied at 110 and may be removed before the welding operation. The pulling open of the valve opening when the bottom is being compressed may alternatively be effected with the aid of an adhesive tape 111 arranged as shown in FIG. 24 to connect the valve to the bottom. It is also recommendable to stiffen in the axial direction the valve hose protruding from the sack so that the hose can easily be pulled over the filling pipe.

FIG. 25 shows a length of tubing 120 having longitudinal edges 121 and 122 and end edges 123, 124. This length of tubing forms a blank for the manufacture of a sack. When the end edges 123, 124 have been spread apart, the length of tubing 120 is folded open at its open end to assume the form apparent from FIG. 26, with triangular pockets 127, 128. Triangular plates 130, 131 are then fitted into the pockets 127, 128. Thereafter the cover sheet 140 having longitudinal edges 141 and end edges 142 is applied to the triangular pockets 127 and 128 and is initially joined to them by seam welds 143, 145. A valve insert 159 may also be disposed in the position indicated between the bottom sheet 140 and the triangular pocket 128. In this case, the bottom sheet 140 preferably overlaps the pocket 128 with an additional portion and an additional seam weld 144 is provided. The inserted plates 130 and 131 prevent an undesired welding between the inside surfaces of the triangular pockets 127, 128 during the making of the seam welds 143 to 145. If the sack is also provided with a valve insert 159, the inside surfaces of the same, which face each other, must also be isolated from each other by a weld-preventing separating means during the making of the welded seams.

When the seam welds 143–145 extending parallel to the end edges 142 of the bottom sheet 140 have been completed, the plates 130, 131 are removed from the pockets 127, 128 (see FIG. 27) and the bottom sheet 140 is then connected by seam welds 146, 147 to the triangular pockets in the areas in which it overlaps the same and to the inside surfaces of the walls. Where these seam welds 146, 147 extend on the triangular pockets 127, 128, the mutually confronting inside surfaces of these pockets will also be united.

The bottom portions disposed beyond the lines 151, 152 are finally folded toward each other on these lines to overlap in an area 148 shown in FIG. 28. When the outside surface of the bottom sheet has been shielded by a suitable separating means, e.g., a layer of paper, a metal foil, or a strip of wood or metal, from the bottom portions folded toward each other, a weld will be obtained in the overlap area 148.

The welds themselves may consist of linear seams (see the seam welds 143–147), which are preferred for joining the two bottom portions in the overlap area 148, or of welded areas, in the form of an extended, continuous zone. Such a zone may extend even beyond the actual overlap area 148 and close to the lines 151, 152. In the example shown in FIG. 28, the four layers disposed in the overlap area 148 and the adjoining double layers are joined by a weld extending close to the lines 151, 152 to form an integral structure so that the bottom is very stiff. To increase this effect, an additional cover sheet may be applied to the crossed bottom before the welding operation is performed.

The stiffness of the bottom may be increased so that the bottom will resiliently bulge under the action of compressive forces acting towards each other in mutually opposite directions at right angles to the edges 151, 152 to facilitate the access to the valve insert 159. When said compressive forces have been removed, the bottom will automatically return to its flat condition and by its inherent stress will assist the sealing action of the valve.

In making such welded areas, the entire area to be welded is transformed by heating into a coherent, softened mass. This will particularly promote the bonding between the various layers so that the pressure per unit area required to ensure a satisfactory bond is much less than with linear seam welds. The frequently existing tendency of the material to be torn close to a linear seam weld is also eliminated by the welded area.

The walls of the sacks may be torn due to a defect in the material or by contact with a pointed object. The filled sack cannot be welded. A makeshift remedy resides in sealing the crack with a sheeting consisting of a material similar to that of the walls of the sack and provided with a self-adhering compound (TESA–FILM). It has been found in practice that the resulting joints will last in any case until the contents of the sack can be filled into a new container. To ensure that such an adhesive sheeting will always be ready at hand in case of need, it is suitable to supply each sack inherently with such material. The latter may be accommodated to advantage at covered locations, for instance, in the pocket defined by the infolded bottom portions and the outside of the bottom sheet 140. In this pocket, the adhesive tapes may be connected by an adhesive layer to the inside surface of the bottom portions overlapping each other in the zone 148. In a manner known, the adhesive layer may be covered in a short length at the end of the tape to facilitate the subsequent stripping of the tape.

FIG. 29 shows a length of tubing 160 having longitudinal edges 161, 162 and end edges 163, 164 and provided with slits extending from the open ends of the tubing. These slits have boundary edges 165, 166 and 167, 168 and define wall portions 169. This length of tubing is folded open according to FIG. 30 to form the triangular pockets 171, 172, beyond which the wall portions 169 extend. The bottom sheet 182 is caused to overlap the rectangular extensions 173, 174 of the triangular pockets 171, 172, which extensions have end edges 165, 167. The bottom sheet is then joined to the projections 173, 174 by seam welds 183, 184 extending parallel to the longitudinal direction of the tubing. The inside surfaces of the wall portions disposed below the triangular pockets are covered by a separating means 180 so that the weld is restricted to the confronting surface portions of the projections 173, 174 and of the bottom sheet 182.

Those boundary edges of the rectangular separating means 180 which extend parallel to the longitudinal direction of the tubing are spaced the same distance apart as the slits 165, 166 and 167, 168 apparent from FIG. 29. This provides for a guidance of the separating means and enables the same to be inserted in the longitudinal direction of the tubing below the projections of the pockets so that both welding areas for the seam welds 183, 184 may be covered in one operation.

The bottom sheet 182 may either be applied to the triangular pocket from the outside or may be arranged just as the separating means below the projections 173, 174 of the triangular pockets 171, 172 and be located in this position. In the latter case, the bottom sheet 182 may previously be provided on its surface remote from the welding areas with a layer of a suitable separating means so that a welding to the adjacent inside surfaces of the bottom portions during the making of the seam welds 183, 184 is prevented and the need for using the separating means 180 is eliminated.

When the triangular pockets have been bridged by the bottom sheet 182, the bottom portions formed by folding open the length of tubing from its open ends are symmetrically infolded along the lines 191, 192 extending substantially at right angles to the longitudinal direction of the tubing. In this operation, the wall portions 169 are caused to overlap in the area 200 as is shown in FIG. 31. The wall portions 169 are then connected by seam welds 201, 202 while the underlying bottom area is covered by a separating means 204, which may consist, e.g., of a swordlike implement.

The sack must be closed in the bottom area by seam welds 185 and 186 extending throughout the width of the bottom as is shown in FIG. 30, in which it is indicated that these seam welds may already be made when the bottom is still folded open. The welding area must only be shielded from the underlying sack wall. Lying beyond the fold lines 191, the seam welds 185, 186 will be disposed inside the actual bottom area when the bottom portions have been infolded about these fold lines 191, 192 so that the stresses in the seam welds 185, 186 are substantially tangentially directed.

As is apparent from FIG 31, the seam welds extending at right angles to the longitudinal direction may alternatively be made when the bottom portions have been folded about the lines 191, 192. In this case, the separating means 204 must be so wide that it can cover also the surface below these welding areas. When this covering by the separating means 204 has been provided, the seam welds 187, 188 may be made together with the seam welds 201, 202 in one operation.

As contrasted with the slitted length of tubing shown in FIG. 29, FIG. 32 shows a length of tubing 210, from the ends 213, 214 of which approximately rectangular strips have been removed so that corresponding rectangular cut-out portions are formed which are symmetrical with respect to the longitudinal edges 211, 212 of the tubing and the small ends 215, 217 of which are parallel to the longitudinal direction of the tubing. The length of tubing 210 which has thus been pretreated is also folded open at its ends 213, 214 to form the triangular pockets 221, 22. It is apparent in FIG. 33 that the triangular pockets 221, 222 are continued by rectangular extensions 223, 224, which just as the extensions 173, 174 shown in FIG. 30 form a guide for the separating means 230 and/or the bottom sheet 232 as well as surfaces at which the triangular pockets are joined to the bottom sheet 232.

The relations and requirements for welding the bottom sheet 232 by means of the seams 233, 234 to the triangular pockets 221, 222 are substantially the same as in the case of the bottom sheet 182. With the special form of the cut apparent from FIG. 32, however, the bottom sheet 232 will have boundary edges extending transversely to the longitudinal direction of the tubing and beyond those boundary edges of the bottom portions which extend transversely to the longitudinal direction of the tubing so that when the bottom portions have been infolded about the fold lines 241, 242 extending transversely to the longitudinal direction of the tubing, the free marginal areas of the bottom sheet 232 overlap in an area 250 (FIG. 34) and can be fixed there by seam welds 251, 252 while the underlying bottom area is covered by a separating means 280. The remarks made in connection with the previously explained process apply also to the seam welds 235, 236 and 237, 238, extending transversely to the longitudinal direction of the tubing.

As is apparent from FIG. 35, the small ends of the cut-out portions formed at the ends 313, 314 of the length of tubing 310 may have a length which exceeds by the width of the subsequently formed overlap area 330 (FIG. 36) the distance 316 between the narrow ends 315, 317. In this case, the rectangular projections adjoining the triangular pockets 321, 322 may be caused to overlap directly in the area 330, where they can be fixed by seam welds 331, 332, without need for a separate bottom sheet bridging the triangular pockets. Those areas adjacent to the sack bottom which remain initially open are closed by the seam welds 335, 336 extending transversely to the longitudinal direction of the tubing. As in folding a crossed bottom, the bottom portions disposed beyond the fold lines 341, 342 may then be folded toward each other to overlap in the area 350 (FIG. 37) and may be joined there by seam welds 351, 352, a weld-preventing separating means 380 again ensuring that the seam welds 351, 352 will not affect the underlying bottom surface. Just as in the processes described hereinbefore, the seam welds extending transversely to the longitudinal direction of the tubing may alternatively be made in the form of seam welds 337, 338 after the bottom portions have been folded one over the other.

FIG. 38 shows another method of completing the bottom. It shows that the bottom portions are not folded toward each other according to FIG. 37 but are bridged by a separate cover sheet 360 of preferably rectangular form, which overlaps the bottom portions from the outside of the walls of the sack. The cover sheet 360 is aligned so that the distance between the bottom boundary edges 315 and 317, measured on the cover sheet, is less than the distance between these boundary edges 315, 317 in spread condition. This affords the advantage that the seam welds 365, 366 connecting the cover sheet 360 to the bottom portions are drawn into the interior of the actual bottom area when the sack has been filled so that these seams are subjected to substantially tangential stresses, to which seam welds in plastics are known to be much more resistant than to normally directed stresses.

Instead of providing separate seam welds 201, 202; 251, 252; 351, 352 in the overlap areas 200; 250; 350; the welding in the overlap areas may result in a continuous welded area extending throughout the overlap area. The welded area may extend close to the boundary edges 191, 192; 241, 242; 341, 342 so that the need for separate outer longitudinal seams 187, 188; 237, 238; 337, 338 is eliminated.

The bottom sheets 182, 232 and the cover sheet 360 may consist particularly of a material which is soft and yieldable compared to the material used for the remaining portions of the sack so that the peak stresses set up by shock loads suddenly applied to the entirely filled sack will be taken up by the cover and bottom sheets and the relatively non-yielding other parts of the sack walls will be protected against tearing under such loads.

Attention is also directed to the advantage afforded by the design of the sack bottom according to FIGS. 31, 34, 37 and 39 and residing in that the pocketlike design of the bottom enables the sacks to be suspended directly at the bottom. For this purpose, a suitable carrying arm may simply be inserted into the pockets provided in the bottom area. If the sack is provided with a valve and is suspended so that the valve is at the lower end of the sack, the valve can be forced open to enable the sack to be emptied in a particularly convenient manner by gravity.

What is claimed is:

1. A process of manufacturing bags which are prismatic when filled, from a length of flat plastic tubing formed by two elongated superimposed sheets having free transverse end edges and being integrally joined at longitudinal edges thereof, said process comprising the steps of inwardly folding triangular portions from said flat tubing at each corner thereof while simultaneously folding at opposite ends of said tubing a portion of one sheet along a first fold line parallel to the respective end edge thereof against the remainder of said one sheet so as to form at each end of said tubing a pair of triangular pockets facing with open ends each other and respectively having apices at opposite longitudinal edges of said sheets and bases substantially parallel to said longitudinal edges; folding the folded sheet portions of said one sheet and the end portions of the other sheet adjacent thereto respectively against each other along second fold lines parallel to said first fold lines and closer thereto than to the corresponding free edge of the respective sheet so that the folded portions will overlap each other; inserting a weld-preventing separating means over one of the triangular portions of each pair of triangular pockets and beneath the overlapping folded portions into the other of the pair of pockets; welding said overlapping sheet portions to each other and to the triangular portion forming said other pocket; and subsequently withdrawing said weld-preventing separating means in direction of said fold lines to leave between said one triangular portion and said overlapping portions a filling opening for filling material into the bag.

2. A process as set forth in claim 1 and including the steps of welding an elongated sheet to at least one of said triangular portions and having a width substantially equal to the base of said portion with opposite end portions of said elongated sheet respectively projecting beyond the apex of said one triangular portion and the base thereof; folding said additional sheet during folding of said overlapping portions to form a tubular portion with overlapping edges from said additional sheet; inserting said weld-preventing separating means through said tubular portion; and welding said overlapping edges to each other simultaneously with the welding of said overlapping portions.

3. A process as set forth in claim 1, wherein said weld-preventing separating means is constituted by a sword-like rigid implement.

4. A process as set forth in claim 1, wherein during folding of said sheet portions along said second fold lines each of said triangular portions is folded along a pair of fold lines inclined with respect to each other and approaching each other at the inner ends thereof so as to form in the finished bag filling openings having each a width smaller than the distance between said second fold lines.

5. A process as set forth in claim 1, and including the steps of placing an additional sheet over the triangular portions forming at least one pair of opposite pockets and overlapping at least in part said triangular portions; sandwiching a valve tube of weldable material between one triangular portion and the portion of said additional sheet overlapping said one triangular portion; placing weld-preventing separating means into said pockets and an additional weld-preventing means into said valve tube; and welding said additional sheet along edge portions thereof to said valve tube and to sheet portions of said tubing beneath said additional sheet.

References Cited by the Examiner

UNITED STATES PATENTS

| 2,193,755 | 3/1940 | Avery | 229—60 |
| 2,353,402 | 7/1944 | Haslacher | 93—35 |
| 2,741,956 | 4/1956 | Diffenbaugh | 93—8 |
| 2,771,010 | 11/1956 | Piazze | 93—35 |
| 2,799,443 | 7/1957 | Luhrmann | 229—60 |
| 3,006,257 | 10/1961 | Orsini. | |
| 3,043,199 | 7/1962 | Niemeyer | 93—35 X |
| 3,069,303 | 12/1962 | Scholle | 93—8 X |

FRANK E. BAILEY Primary Examiner.

FRANKLIN T. GARRETT, BERNARD STICKNEY,
*Examiners.*